(12) United States Patent
Morand

(10) Patent No.: US 7,678,994 B2
(45) Date of Patent: Mar. 16, 2010

(54) ENCAPSULATING PERMANENT WIRE CONNECTOR

(75) Inventor: Michel Morand, Ile des Soeurs (CA)

(73) Assignee: Flextherm Inc., Longueuil, Quebec (CA)

( * ) Notice: Subject to any disclaimer, the term of this patent is extended or adjusted under 35 U.S.C. 154(b) by 351 days.

(21) Appl. No.: 11/898,541

(22) Filed: Sep. 13, 2007

(65) Prior Publication Data

US 2008/0173466 A1    Jul. 24, 2008

(30) Foreign Application Priority Data

Jan. 23, 2007    (CA) .................................... 2574859

(51) Int. Cl.
*H02G 3/02*    (2006.01)

(52) U.S. Cl. .......................................... 174/76; 439/936

(58) Field of Classification Search .................. 174/76, 174/84 R; 439/936, 874

See application file for complete search history.

(56) References Cited

U.S. PATENT DOCUMENTS 3,593,002 A * 7/1971 Hebert ........................ 219/541
4,883,925 A * 11/1989 Graf .......................... 174/84 R

* cited by examiner

*Primary Examiner*—Javaid Nasri
(74) *Attorney, Agent, or Firm*—Ogilvy Renault LLP

(57) ABSTRACT

An encapsulating permanent wire connector is comprised of a housing provided with a first port and a second port. At least one division wall extends coaxially in a portion of the housing to a side of a straight central axis of the housing and defines an electrically isolating cavity in the housing. The housing has an opening to inject a sealing substance therein. Air evacuation holes are associated with the electrically isolating cavity for the escape of air therefrom when a sealing substance is injected within the housing with soldered wire connections being disposed in the housing and isolated from one another by the electrically isolating cavity. In a preferred embodiment, there are two spaced-apart electrically isolating cavities with a central cavity therebetween.

17 Claims, 2 Drawing Sheets

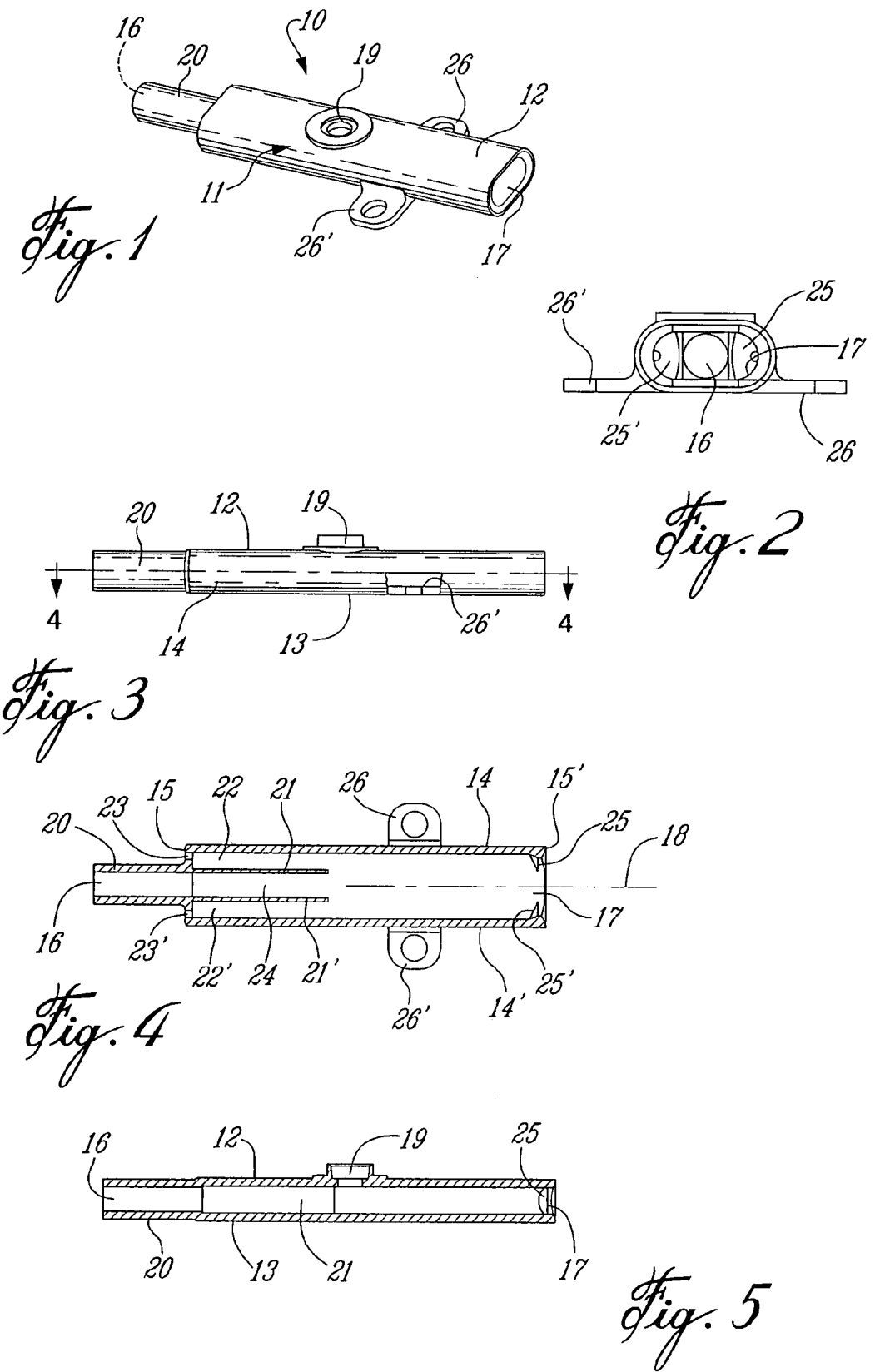

ENCAPSULATING PERMANENT WIRE CONNECTOR

TECHNICAL FIELD

The present invention relates to an encapsulating permanent wire connector, and particularly, but not exclusively for protecting soldered wire ends of a cold wire to a heating wire and wherein the connector and heating wire are intended to be disposed in a humid mass.

BACKGROUND ART

It is customary when fabricating electrically heated floors to connect the wire leads of the heating wires together by solder and then to position a shrinkable isolating sleeve over the soldered interconnection whereby to protect the connection and provide electrical insulation. Shrink sleeves are usually provided with an inside layer of hot glue and they are of a length of about 4 to 5 inches. A disadvantage with these is that one cannot warranty-that the placement of wires is fully secure. These isolating sleeves are required for every welded connection. Because these sleeves are flexible the welded connections and the entire assembly remain flexible which makes it more fragile and thus could lead to breakage or damage to the welded connection. The securement of these sleeves is also a time-consuming and inaccurate process. Air can also be trapped in these double wall construction shrink sleeves and this could eventually result in corrosion of the welded interconnection.

Further, often these insulating shrink sleeves do not form a perfect seal about the wires and this exposes the leads which are welded and permitting humidity infiltration into the soldered connection resulting in rust formation and affecting the conductivity of the wire or resulting in a wire breakage and short circuit. When a short circuit arises after the wires have been embedded in cured cement it is necessary to find the break in the wire and to then repair the connection. This often necessitates breaking ceramic floors which have been disposed over the cement and this is a time-consuming and expensive operation. Therefore, there is a need to provide connections which are well protected and entirely insulated form humidity and the ground.

Another disadvantage of the interconnection between such wires is that the welded connection and isolating sleeve is of irregular shape. These connections are also not resistant to impact and because these wires are usually installed by construction workers they are subject to all sorts of abuse caused by people walking over the connectors or subjecting the connectors to excessive shock. When setting the shrink sleeves about the connections, it results in a section of the wire having an unstable shape and therefore in order to make sure that these connections are embedded under the surface of the cement that is placed thereof, often it is necessary to make a cavity in the sub-floor and to secure the connection therein by glue or other means. A still further disadvantage of these prior art interconnections is that they are time-consuming to make and, therefore, expensive.

SUMMARY OF INVENTION

It is a feature of the present invention to provide an encapsulating permanent wire connector which substantially overcomes all of the above-mentioned disadvantages of the prior art.

Another feature of the present invention is to provide an encapsulating permanent wire connector which is easy and quick to assemble, which provides a permanent wire connection which is electrically insulated and water-proof and which is easy to install.

According to another feature of the present invention there is provided a method of interconnecting and permanently encapsulating two wires together.

According to another broad aspect of the present invention there is provided a method of interconnecting and permanently encapsulating two 3-lead wires to one another.

According to the above features, from a broad aspect, the present invention provides an encapsulating permanent wire connector which is comprised of a housing having a first port and a second port. At least one division wall extends coaxially in a portion of the housing to a side of a straight central axis of the housing and defines an electrically isolating cavity in the housing. An opening is provided in the housing to inject a sealing substance therein. Air evacuation means are associated with the electrically isolating cavity.

According to a further broad aspect of the present invention the housing is provided with two division walls, each division wall being positioned on a respective side of opposed sides of the straight central axis adjacent the first port and forms two spaced apart isolating cavities in the housing.

According to a further broad aspect of the present invention there is provided a method of interconnecting and permanently encapsulating two 3-lead wire interconnections. The method comprises the steps of providing a housing having a first and second port. An electrically isolating cavity is formed on opposed sides of a straight central axis of the housing by a pair of division walls which extend coaxially in a portion of the housing adjacent the first port. The housing has an opening therein to inject a sealing substance. The electrically isolating cavities are further provided with air evacuation means. A first of the two 3-lead wires is passed through the housing from the first port and out the second port. An end section of the leads of the two 3-lead wires are exposed by removing an insulating sheath from an end portion thereof. Common ones of the lead end portions of the two 3-lead wires are soldered together with a central one of the leads extending on a substantially straight axis and opposed ones of the welded leads angled towards the first port in a spaced-apart relationship. The opposed one of the welded leads are placed in an open end of the second port while applying a pulling force on the first of the two 3-lead wires to orient the opposed ones of the welded leads in a respective one of the electrically isolating cavities thereby arresting the pulling force. A sealing substance is then injected in the housing through the opening and causes air in the electrically isolating cavities to escape through the air evacuation means whereby the sealing substance is disposed in substantially all free space in the housing to seal the space and arrest and isolate the wires and welded leads therein.

BRIEF DESCRIPTION OF DRAWINGS

A preferred embodiment of the present invention will now be described with reference to the accompanying drawings in which:

FIG. 1 is a perspective view of the encapsulating permanent wire connector of the present invention;

FIG. 2 is an end view of the connector housing as seen from the second port thereof;

FIG. 3 is a side view of FIG. 1;

FIG. 4 is a cross-section view along section line 4-4 of FIG. 3;

FIG. 5 is a side cross-section view along the longitudinal central axis of the connector;

DESCRIPTION OF PREFERRED EMBODIMENTS

Figure 6:
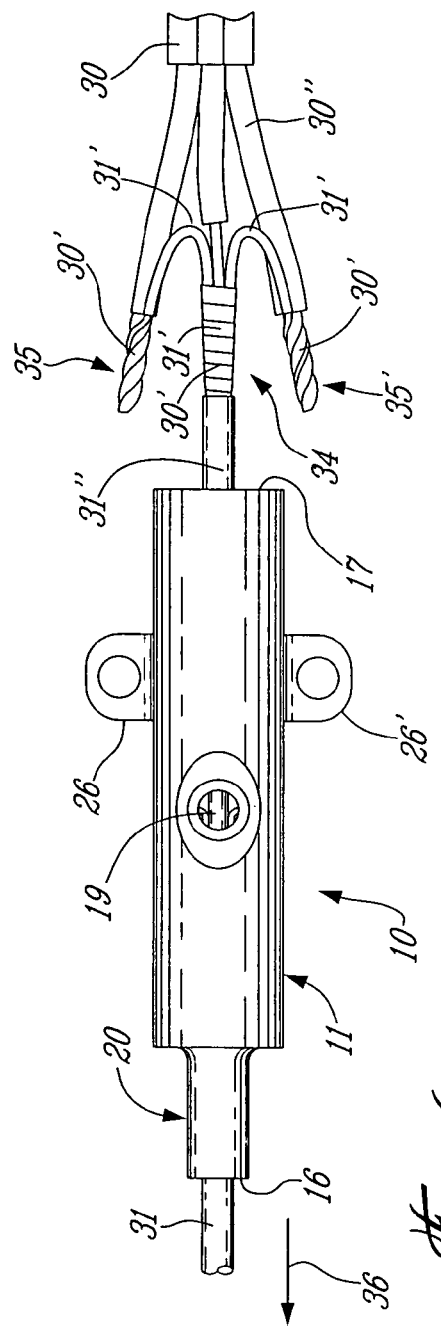
FIG. 6 is a top view of the connector showing the welded leads interconnections of two wires prior to insertion into the connector housing.

Referring now to the drawings and more particularly to FIGS. 1 to 5, there will be described the construction of the encapsulating permanent wire connector 10 of the present invention. The connector 10 is comprised of a housing 11 which is molded from a plastics material such as polypropylene or other suitable plastic which is capable of resisting to shocks or acid solutions as found in concrete slurries where such connectors and heating wires are usually embedded. The polypropylene also provides excellent electrical insulation for the connections of the leads of the wires. In the particular application of this connector, wherein it is to be used for interconnecting a cold wire from a thermostat to an electrically heating wire to be embedded in cement it is important that the physical properties of the connector be able to resist to its environmental use and accordingly it needs to also provide water-proof protection to the connections.

As hereinshown, the housing 11 is a generally elongated rectangular housing having opposed flat top wall 12 and bottom wall 13 as well as opposed side walls 14 and 14'. Opposed end walls 15 and 15' are also provided and a first port 16 extends into the end wall 15 and a second port 17 is disposed in the other end wall 15'. As better seen in FIG. 4, these ports are axially aligned on the central longitudinal axis 18 of the housing.

The housing is further provided with an opening 19 in the top wall 12 of the housing to permit the injection of a sealing substance within the housing as will be described later. It also provides a peephole to verify that the wires are correctly positioned before injecting the sealing substance.

As shown in these Figures, the first port 16 extends in a straight tubular formation 20 which projects from the end wall 15 which is associated with the first port and this projection extends coaxially with the straight central axis 18 of the housing. The first port 16 is also of circular cross section. The second port 17, as better seen from FIG. 2, has a generally oval shape whereby to receive a larger, generally flat wire therein as opposed to the first port which is intended to receive a smaller circular wire therein and these ports are dimensioned for close friction fit of the wires in the ports to prevent the escape of a sealing substance which is injected under pressure within the housing.

As better seen in FIGS. 2 and 4, the housing is provided with at least one, herein two, division walls 21 and 21' which extend coaxially, in a portion of the housing to a respective side of the port 16. These division walls extend from across the top and bottom walls 12 and 13 of the housing and terminate a predetermined distance therein whereby to form electrically isolating cavities 22 and 22' respectively within the housing. The end wall or base of these cavities 22 and 22' are formed by the end wall 15 and these end walls are each provided with air escape holes 23 and 23', respectively, and these constitute air evacuation means whereby to prevent air from being trapped within these cavities when a sealing substance is injected under pressure within the housing and is caused to flow in interstitial space in the cavity which contains wire connections to completely isolate them. The division walls 21 and 21' serve as electrical insulators for wire connections to be disposed therein. A further straight wire connection is also disposed in the housing between the division walls in a central cavity defined by the space 24. As can be seen from FIG. 4 these division walls extend parallel from one another and are of approximate equal size. However, it is within the ambit of the present invention to cover obvious modifications wherein it is conceivable that these cavities could be of different sizes. It is also conceivable that there may be provided only a single cavity if the two wires to be interconnected together are provided with only two leads for other applications.

As better seen from FIGS. 2, 4 and 5 the second port 17 is further provided adjacent an exterior end thereof with inwardly projecting deformable sealing webs 25 and 25'. These sealing webs are formed integral with the housing and extend inwardly from the opposed side walls 14 and 14' and are provided for frictional and deformable engagement with opposed side edges of a wire to be received therein, herein wire 30. These webs seal the second port about the wire 30, as will later be described later and prevent the egress of a sealing substance injected within the housing.

The housing 11 is further provided with a pair of attaching tabs 26 and 26' which are formed integral with the housing and project from opposed sides of the side walls 14 and 14' adjacent the bottom wall 13 thereof. They provide for secure and quick attachment of the housing onto a flat support structure such as floor paneling. It is also pointed out that the opening 19 is dimensioned such as to receive a nozzle end of a sealant dispensing device for injecting the sealing epoxy or polyethylene material, or the like, therein.

Figure 7:
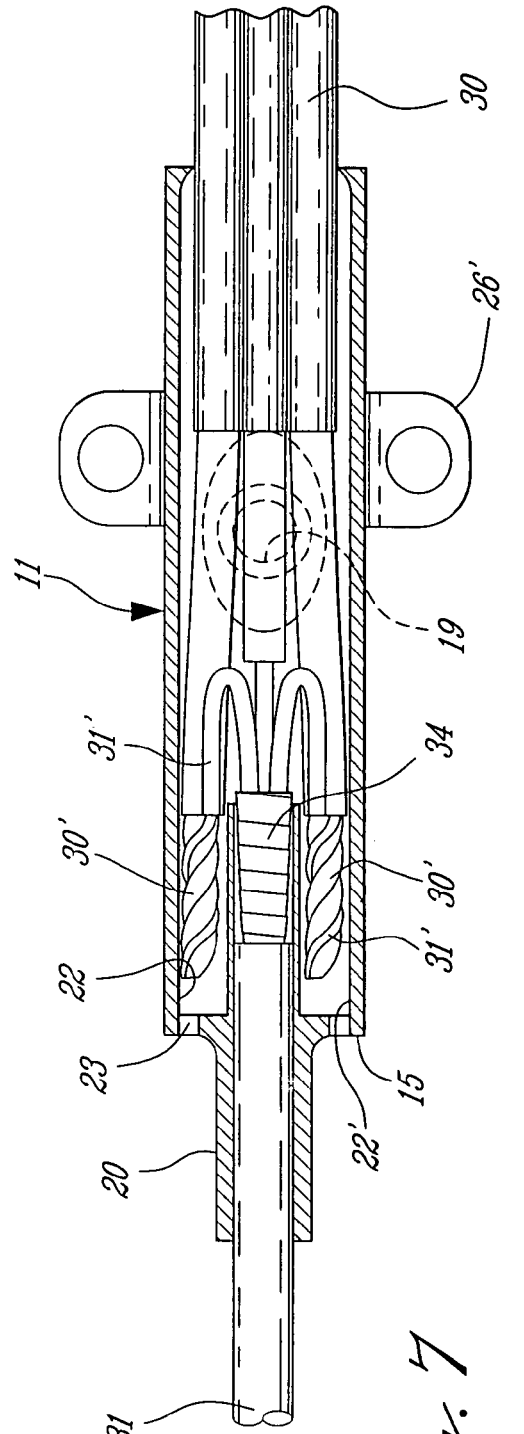
FIG. 7 is a perspective view showing the interconnections of two wires disposed in the connector for encapsulation therein.

With reference now to FIGS. 6 and 7 there will be described the use of the connector and how two wires have their interconnected soldered leads sealed therein. As previously described, the wire connector 10 of the present invention was developed to provide permanent encapsulation of the leads of two wires one being a cold wire connected to a thermostat and the other a heating wire to be embedded into cement. These wires are illustrated in FIGS. 6 and 7 and are 3-lead wires, herein wire 30, the cold wire, and wire 31, the heating wire. As hereinshown the heating wire 31 has an end portion which is passed through the first port 16 in the tubular formation 20 and out of the second port 17 of the housing. Heating wire 31 is provided with thee leads 31', one being a central lead and the other two opposed electrical conducting leads. The end section of the sheathing 31" is removed to expose the leads 31. Likewise, the sheathing 30" of the wire 30 is also removed in an end section thereof to expose its three leads 30'. Common ones of the exposed lead end portions are soldered together with the central one of the leads 31' and 30' extending on a substantially straight axis and opposed ones of the leads soldered together with the leads disposed outwards towards the second port 17 and in a spaced-apart relationship. An insulation material can also be sprayed or otherwise adhered to the soldered leads.

After this soldering step is effected, the opposed ones of the soldered leads, herein identified by reference numerals 35 and 35', as well as the central welded leads 34, are placed in the open end of the second port 17 while applying a pulling force on the heating wire 31 in the direction of arrow 36 whereby to draw the soldered leads in the housing causing the opposed ones of the welded leads 35 and 35' to orient themselves into respective ones of the electrically isolating cavities 22 and 22'. Once the soldered leads are in position within the isolating cavities 22 and 22' and are at the base thereof, they will provide resistance against the pulling force 36 indicating that the soldered connections are in place and electrically isolated from one another by the division walls 21 and 21', as clearly shown in FIG. 7. It is then time to inject the sealing substance within the housing through the opening 19 provided in the top wall. The housing 11 is shown in FIG. 7 in phantom lines whereby to visualize the position of the interconnection of the two wires. As the sealing substance is injected within the housing air is evacuated through the air escape holes 23 in the end wall 15 of the housing permitting the sealer to flow therein.

As shown in FIG. 6, in order to orient the outside leads in a bent back position, as shown at 35 and 35', the lower gauge leads of the heating wire 31 are bent back and being of a lower gauge they are much more flexible than the stiffer leads 30' of the cold wire 30. It is also pointed out that the wire interconnection and their securement in the connector is done in a shop environment whereby the interconnection of the wires with the connector form a harness which is used by installers. It would not be feasible to effect the assembly of the two wires and the connector at a construction site where the installation is taking place as that type of environment is not suitable for such. It is also pointed out that once the epoxy or polypropylene is injected within the housing and sets, the interconnection then becomes immovable and permanent with the interconnection being encapsulated and water-proof sealed from its environment.

Summarizing, the encapsulating permanent wire connector of the present invention provides several advantages, one being impact resistant and electrically insulating. It provides maximum-water tightness due to the fact that a flexible epoxy or any other flexible encapsulating material is injected within the housing making the housing waterproof and free of air traps due to proper venting thereof. This permits one to warranty the interconnection. The shape and thin wall structure of the housing also provides for a connector which is of a compact and flat shape and easy to secure to a support structure. The connector also allows for maximum tolerances between the heating wire or cable and the cold lead wire or cable. After the epoxy has set, it is safe and easy to manipulate the harness without risk of braking or otherwise damaging the soldered connections. The connector and wires can also be assembled very quickly.

It is within the ambit of the present invention to cover any obvious modifications of the preferred embodiment described herein provided such modifications fall within the scope of the appended claims.

The invention claimed is:

1. An encapsulating permanent wire connector comprising a housing having a first port and a second port, at least one division wall extending coaxially in a portion of said housing to a side of a straight central axis of said housing and defining an electrically isolating cavity in said housing, an opening in said housing to inject a sealing substance therein, and air evacuation means associated with said electrically isolating cavity.

2. An encapsulating permanent wire connector as claimed in claim 1 wherein said first and second ports are axially aligned with one another on said straight central axis of said housing.

3. An encapsulating permanent wire connector as claimed in claim 2 wherein said first and second ports are dimensioned to receive a respective one of two wires in close friction fit therein.

4. An encapsulating permanent wire connector as claimed in claim 3 wherein said housing is provided with two of said division walls, each division wall being positioned on a respective side of opposed sides of said straight central axis adjacent said first port and forming two spaced apart electrically isolating cavities.

5. An encapsulating permanent wire connector as claimed in claim 4 wherein said air evacuation means is an air evacuating hole in said housing disposed to evacuate air from an end of said electrically isolating cavities.

6. An encapsulating permanent wire connector as claimed in claim 4 wherein said housing is a generally elongated rectangular housing having opposed flat top and bottom walls, opposed side walls and opposed end walls, said first and second ports being disposed in a respective one of said end walls, said opening being disposed in said top wall.

7. An encapsulating permanent wire connector as claimed in claim 6 wherein said division walls extend parallel and spaced from a respective one of said opposed side walls to define the elongated electrically isolating cavity, said air evacuating hole of each electrically isolating cavity extending from said end wall associated with said first port.

8. An encapsulating permanent wire connector as claimed in claim 6 wherein said first port extends in a straight tubular formation projecting from said end wall associated with said first port and extending coaxially with said straight central axis of said housing.

9. An encapsulating permanent wire connector as claimed in claim 6 wherein said second port is dimensioned to receive a larger, generally flat, wire therein, said second port adjacent an exterior end thereof being provided with inwardly projecting deformable sealing webs extending inwardly from said opposed side walls for frictional and deformable engagement with opposed side edges of said larger wire to substantially seal said second port at said exterior end when said larger wire extends therein.

10. An encapsulating permanent wire connector as claimed in claim 6 wherein said housing is a molded plastic housing, said housing being further comprised with an attaching tab formed integrally therewith and projecting from a respective one of said opposed side walls adjacent said bottom wall.

11. An encapsulating permanent wire connector as claimed in claim 6 wherein said housing is molded from a plastic material which is electrically insulating and impact resistant.

12. An encapsulating permanent wire connector as claimed in claim 4 wherein said wire connector is adapted to encapsulate interconnections of two 3-lead wires, said three leads of each said two 3-lead wires having common ones of their leads soldered together, a central one of said three leads being soldered in a substantially straight orientation and opposed ones of said three leads being soldered together and bent back to a common side facing said first port and extending spaced and substantially parallel to said straight oriented soldered central leads, said opposed ones of said bent back soldered leads being disposed in a respective one of said two spaced-apart electrically isolating cavities.

13. An encapsulating permanent wire connector as claimed in claim 12 wherein said soldered leads of said two 3-lead wires are immovably retained in said housing by said sealing substance which is injected through said opening and hardened in said housing.

14. An encapsulating permanent wire connector as claimed in claim 13 wherein one of said two 3-lead wires is a cold wire connected to be connected to a thermostat and the other of said two 3-lead wire is a heating wire for embedding in a cement together with said housing.

15. A method of interconnecting and permanently encapsulating two 3-lead wire interconnections, said method comprising the steps of:
 i) providing a housing having a first and second port, an electrically isolating cavity formed on opposed sides of a straight central axis of said housing by a pair of division walls which extend coaxially in a portion of said housing adjacent said first port, said housing having an opening therein to inject a sealing substance, and air evacuation means in said electrically isolating cavities, ii) passing a first of said two 3-lead wires through said housing from said first port and out said second port, iii) exposing an end section of said leads of said two 3-lead wires by removing an insulating sheath from an end portion thereof, iv) soldering common ones of said lead end portions of said two 3-lead wires together with a central one of said leads extending on a substantially straight axis and opposed ones of said soldered leads angled towards said second port in a spaced-apart relationship;

v) placing said opposed one of said soldered leads in an open end of said second port while applying a pulling force on said first of said two 3-lead wires to orient said opposed ones of said soldered leads in a respective one of said electrically isolating cavities thereby arresting said pulling force, and vi) injecting said sealing substance in said housing through said opening and causing air in said electrically isolating cavities to escape through said air evacuation means whereby said sealing substance is disposed in substantially all free space in said housing to seal said space and arrest and isolate said wires and soldered leads therein.

16. A method as claimed in claim 15 wherein said step (vi) comprises injecting a polyurethane or epoxy substance in said housing and causing said substance to harden.

17. A method as claimed in claim 15 wherein said first wire is a heating wire of substantially circular cross-section capable of being embedded in a cement, the other of said two 3-lead wires being a larger, generally flat, cold wire for connection to a thermostat, said step (iv) being performed by maintaining said leads of said other wire generally straight and forming a reverse bend of said opposed ones of said leads of said first wire to orient said exposed end portions thereof adjacent said exposed end portions of said opposed leads of said other wire.

* * * * *